(12) United States Patent
Matsumoto et al.

(10) Patent No.: US 9,653,744 B2
(45) Date of Patent: May 16, 2017

(54) METHOD OF STARTING FUEL CELL SYSTEM FOR VEHICLE AND FUEL CELL SYSTEM

(75) Inventors: Mitsunori Matsumoto, Wako (JP); Kazuyoshi Miyajima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1116 days.

(21) Appl. No.: 13/558,354

(22) Filed: Jul. 26, 2012

(65) Prior Publication Data

US 2013/0034786 A1    Feb. 7, 2013

(30) Foreign Application Priority Data

Aug. 2, 2011   (JP) .................................. 2011-169341

(51) Int. Cl.
| | |
|---|---|
| H01M 8/04 | (2016.01) |
| H01M 8/04955 | (2016.01) |
| H01M 8/04029 | (2016.01) |
| H01M 8/04089 | (2016.01) |
| H01M 8/0444 | (2016.01) |
| H01M 8/1018 | (2016.01) |

(52) U.S. Cl.
CPC ... *H01M 8/04955* (2013.01); *H01M 8/04029* (2013.01); *H01M 8/04089* (2013.01); *H01M 8/04485* (2013.01); *H01M 2008/1095* (2013.01); *H01M 2250/20* (2013.01); *Y02T 90/32* (2013.01)

(58) Field of Classification Search
CPC ..................................................... H01M 8/04
See application file for complete search history.

(56) References Cited

U.S. PATENT DOCUMENTS

| | | | |
|---|---|---|---|
| 6,709,779 B2 | 3/2004 | Uozumi | |
| 7,442,454 B2 | 10/2008 | Wakabayashi | |
| 8,347,645 B1* | 1/2013 | Miller | F25B 27/00 62/236 |
| 2005/0058868 A1* | 3/2005 | Taga | H01M 8/04007 429/434 |

(Continued)

FOREIGN PATENT DOCUMENTS

| | | |
|---|---|---|
| JP | 2002-216817 | 8/2002 |
| JP | 2004-158333 A | 6/2004 |

(Continued)

OTHER PUBLICATIONS

JP 2010-140658 MT.*

(Continued)

*Primary Examiner* — Patrick Ryan
*Assistant Examiner* — Alex Usyatinsky
(74) *Attorney, Agent, or Firm* — Mori & Ward, LLP

(57) ABSTRACT

A method of starting a fuel cell system for a vehicle includes determining whether or not an activation signal of a fuel cell provided in the fuel cell system has been inputted, operating, if it is determined that the activation signal has been inputted, a cooling medium circulation pump to supply a cooling medium to an impurity removal mechanism for reducing a conductivity of the cooling medium, and driving an oxidant gas supply device and a fuel gas supply device in the fuel cell system to start activation of the fuel cell if it is determined that the conductivity of the cooling medium is less than or equal to a predetermined value.

10 Claims, 9 Drawing Sheets

(56) References Cited

U.S. PATENT DOCUMENTS

| | | | | |
|---|---|---|---|---|
| 2006/0272868 A1* | 12/2006 | Fuse | ................... | B60L 11/1885 |
| | | | | 180/65.1 |
| 2008/0118797 A1* | 5/2008 | Hirakata | ............. | B60L 11/1816 |
| | | | | 429/430 |
| 2009/0317674 A1* | 12/2009 | Miyajima | ......... | H01M 8/04537 |
| | | | | 429/492 |
| 2010/0250039 A1* | 9/2010 | Bryan | .................... | B60K 6/445 |
| | | | | 701/22 |

FOREIGN PATENT DOCUMENTS

| | | | |
|---|---|---|---|
| JP | 2004-253277 | A | 9/2004 |
| JP | 4066361 | B2 | 2/2005 |
| JP | 2005-073475 | A | 3/2005 |
| JP | 2005-235489 | A | 9/2005 |
| JP | 2005-259528 | | 9/2005 |
| JP | 2007-128811 | A | 5/2007 |
| JP | 2008-271655 | | 11/2008 |
| JP | 2008271655 | * | 11/2008 |
| JP | 2010-140658 | | 6/2010 |
| JP | 2010-153195 | A | 7/2010 |

OTHER PUBLICATIONS

JP2008271655 MT.*
Japanese Office Action for corresponding JP Application No. 2011-169341, Sep. 26, 2014.
Japanese Office Action for corresponding JP Application No. 2011-169341, Jun. 2, 2015.
Japanese Office Action for corresponding JP Application No. 2011-169341, Jan. 5, 2016 (w/ English machine translation).

* cited by examiner

US 9,653,744 B2

METHOD OF STARTING FUEL CELL SYSTEM FOR VEHICLE AND FUEL CELL SYSTEM

CROSS-REFERENCE TO RELATED APPLICATIONS

The present application claims priority under 35 U.S.C. §119 to Japanese Patent Application No. 2011-169341, filed Aug. 2, 2011, entitled "Method of Starting Fuel Cell System for a Vehicle." The contents of this application are incorporated herein by reference in their entirety.

BACKGROUND OF THE INVENTION

Field of the Invention

The present disclosure relates to a method of starting a fuel cell system for a vehicle and a fuel cell system.

Discussion of the Background

For example, in a solid polymer electrolyte fuel cell, a membrane electrode assembly (MEA) is sandwiched between a pair of separators, the membrane electrode assembly including a polymer electrolyte membrane formed of a polymer ion exchange membrane, and the anode and cathode electrodes that are disposed on the respective sides of the polymer electrolyte membrane. In general, a plurality of fuel cells of this type are stacked together to form a fuel cell stack which is incorporated into an in-vehicle fuel cell system, for example.

Normally, in the fuel cell, a fuel gas passage for supplying a fuel gas to the anode electrode is formed between one separator and the membrane electrode assembly, while an oxidant gas passage for supplying an oxidant gas to the cathode electrode is formed between the other separator and the membrane electrode assembly. In addition a cooling medium passage for cooling the membrane electrode assembly is formed between adjacent separators.

A cooling medium supply unit which supplies a cooling medium to a cooling medium passage includes a pump which circulates the cooling medium, a radiator which reduces the temperature of the cooling medium by using the open air, and an ion removal device (impurity removal device). The ion removal device has a function of removing conductive ions such as metal ions which are eluted to the cooling medium from the radiator, the fuel cell stack, walls for forming passages, and the pump.

In above-mentioned fuel cell system, the pump is stopped when the operation of the fuel cell system is stopped, then the cooling medium is not sent to the ion removal device. Therefore, while the operation of the fuel cell system is stopped, conductive ions are eluted into the cooling medium, and the concentration of the conductive ions in the cooling medium increases.

Thus, for example, in the cooling system for a fuel cell disclosed in Japanese Patent No. 4066361 includes a fuel cell which is cooled by a coolant; a heat exchanger which reduces the temperature of the coolant; a coolant passage which is connected between the fuel cell and the heat exchanger so as to circulate the coolant therebetween; a removal device which removes impurities in the coolant in the coolant passage; a pump which circulates the coolant in the coolant passage through the fuel cell and the removal device; and a circulating unit which circulates the coolant in the coolant passage through the removal device while the operation of the fuel cell is stopped.

SUMMARY OF THE INVENTION

According to one aspect of the present invention, a method of starting a fuel cell system for a vehicle includes determining whether or not an activation signal of a fuel cell provided in the fuel cell system has been inputted, the fuel cell including a membrane electrode assembly in which an anode-side electrode and a cathode-side electrode are respectively disposed on both sides of a solid polymer electrolyte membrane; operating, if it is determined that the activation signal has been inputted, a cooling medium circulation pump which constitutes a cooling medium supply device to supply a cooling medium to an impurity removal mechanism for reducing a conductivity of the cooling medium; and driving an oxidant gas supply device and a fuel gas supply device in the fuel cell system to start activation of the fuel cell if it is determined that the conductivity of the cooling medium is less than or equal to a predetermined value, the oxidant gas supply device being provided to supply an oxidant gas to a cathode side of the fuel cell, the fuel gas supply device being provided to supply a fuel gas to an anode side of the fuel cell.

According to another aspect of the present invention, a fuel cell system includes a fuel cell, an oxidant gas supply device, a fuel gas supply device, an activation signal detector, a cooling medium supply device, and a supply controller. The fuel cell includes a membrane electrode assembly. The membrane electrode assembly includes a solid polymer electrolyte membrane, an anode-side electrode, and a cathode-side electrode. The anode-side electrode and the cathode-side electrode are respectively disposed on both sides of the solid polymer electrolyte membrane. The oxidant gas supply device is provided to supply an oxidant gas to a cathode side of the fuel cell. The fuel gas supply device is provided to supply a fuel gas to an anode side of the fuel cell. The activation signal detector is configured to determine whether or not an activation signal of the fuel cell has been inputted. The cooling medium supply device is configured to supply the cooling medium to the fuel cell and includes an impurity removal mechanism and a cooling medium circulation pump. The impurity removal mechanism is provided to reduce a conductivity of a cooling medium. The cooling medium circulation pump is provided to supply the cooling medium to the impurity removal mechanism if the activation signal detector determines that the activation signal has been inputted. The supply controller is configured to drive the oxidant gas supply device and the fuel gas supply device to start activation of the fuel cell if the activation signal detector determines that the conductivity of the cooling medium is less than or equal to a predetermined value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
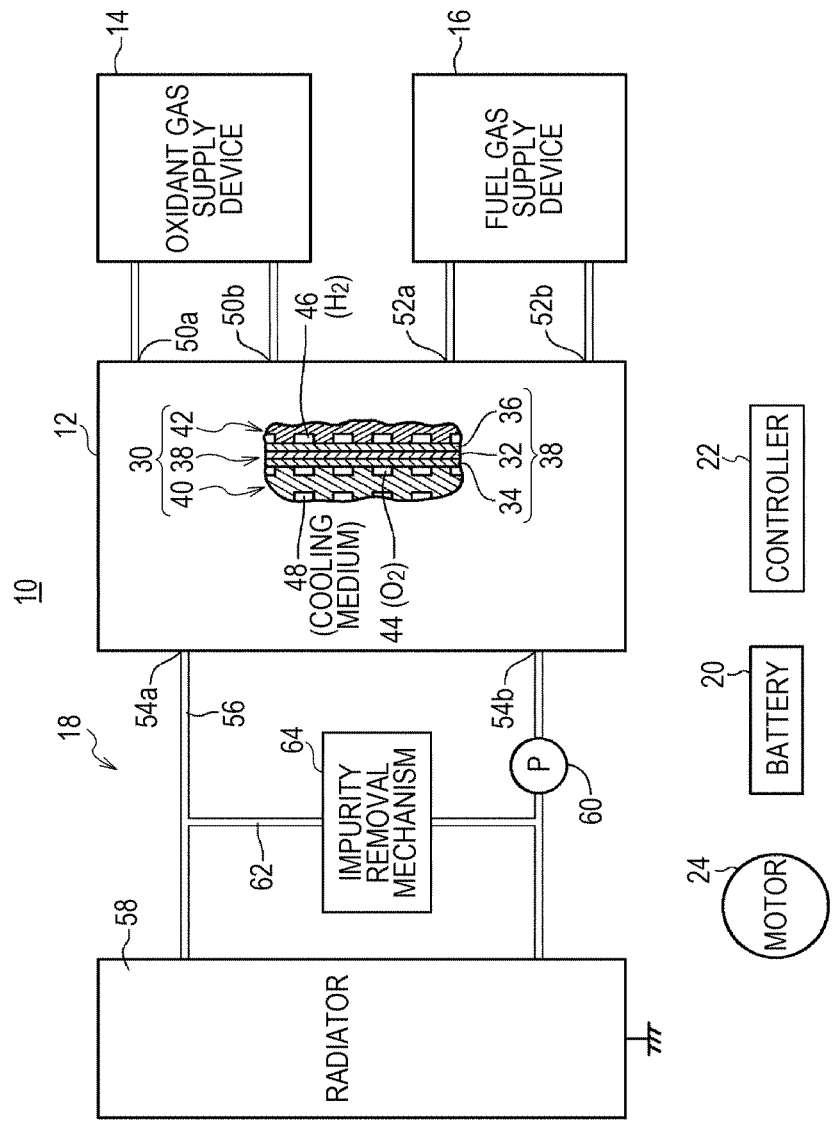
FIG. 1 is a schematic configuration diagram of a fuel cell system which adopts a starting method according to an embodiment of the present disclosure.

The embodiments will now be described with reference to the accompanying drawings, wherein like reference numerals designate corresponding or identical elements throughout the various drawings.

As illustrated in FIG. 1, a fuel cell system for a vehicle 10 which adopts a starting method according to an embodiment of the present disclosure is mounted on a fuel cell vehicle (not shown) such as a fuel cell automobile.

The fuel cell system 10 includes a fuel cell stack 12, an oxidant gas supply unit 14 (oxidant gas supply device) which supplies an oxidant gas to the fuel cell stack 12, a fuel gas supply unit (fuel gas supply device) 16 which supplies a fuel gas to the fuel cell stack 12, a cooling medium supply unit 18 (cooling medium supply device) which supplies a cooling medium to the fuel cell stack 12, a battery 20 such as a storage device, for example, a lithium ion battery, and a controller 22 (activation signal detector, supply controller) which controls the entire fuel cell system 10.

The fuel cell stack 12 and the battery 20 supplies power to a load containing a drive motor 24, and the battery 20 can store regenerative energy. In addition to the battery 20, a capacitor or the like may be used as a storage device.

The fuel cell stack 12 can be formed by stacking a plurality of fuel cells 30 in the horizontal direction or the gravity direction. Each fuel cell 30 includes, for example, a membrane electrode assembly (MEA) 38, in which a solid polymer electrolyte membrane 32 is sandwiched between a cathode electrode 34 and an anode electrode 36, the solid polymer electrolyte membrane 32 being a thin perfluoro sulfonic acid membrane impregnated with water.

The cathode electrode 34 and the anode electrode 36 have a gas diffusion layer which is formed of carbon paper or the like, and an electrode catalyst layer which is formed by uniformly coating the surface of the gas diffusion layer with porous carbon particles which carry platinum alloy (or Ru) on the surfaces thereof. The electrode catalyst layer is formed on the both sides of the solid polymer electrolyte membrane 32.

The membrane electrode assembly 38 is sandwiched between a cathode-side separator 40 and an anode-side separator 42. The cathode-side separator 40 and the anode-side separator 42 includes a carbon separator or a metal separator.

An oxidant gas passage 44 is provided between the cathode-side separator 40 and the membrane electrode assembly 38, while a fuel gas passage 46 is provided between the anode-side separator 42 and the membrane electrode assembly 38. A cooling medium passage 48 is provided between the cathode-side separator 40 and the anode-side separator 42 that are adjacent to each other.

The fuel cell stack 10 is provided with an oxidant gas inlet communication hole 50a that supplies an oxidant gas, for example, an oxygen containing gas (hereinafter also referred to as air), a fuel gas inlet communication hole 52a that supplies a fuel gas, for example, a hydrogen containing gas (hereinafter also referred to as hydrogen gas), a cooling medium inlet communication hole 54a that supplies cooling medium, an oxidant gas outlet communication hole 50b to discharge the oxidant gas, a fuel gas outlet communication hole 52b to discharge the fuel gas, and a cooling medium outlet communication hole 54b to discharge the cooling medium that communicate with each other in the stacking direction of the fuel cells 30.

The oxidant gas supply unit 14 compresses air from the atmosphere, for example, via a compressor (not shown), and supplies the compressed air to the oxidant gas inlet communication hole 50a of the fuel cell stack 12. The fuel gas supply unit 16 is provided with a hydrogen tank (not shown) that stores high pressure hydrogen. A hydrogen gas is supplied from the hydrogen tank to the fuel gas inlet communication hole 52a of the fuel cell stack 12.

The cooling medium supply unit 18 communicates with the cooling medium inlet communication hole 54a and the cooling medium outlet communication hole 54b that are provided in the fuel cell stack 12, and includes a cooling medium circuit 56 which circulates the cooling medium through the fuel cell stack 12.

The cooling medium circuit 56 is provided with a bypass passage 62 which bypasses the radiator 58, and connects a radiator 58 with a cooling medium pump (pump for circulating cooling medium) 60. The bypass passage 62 is provided with an impurity removal mechanism (for example, ion-exchange resin) 64 which removes the conductive component in the cooling medium. The radiator 58 is electrically ground connected to the fuel cell vehicle.

Figure 2:
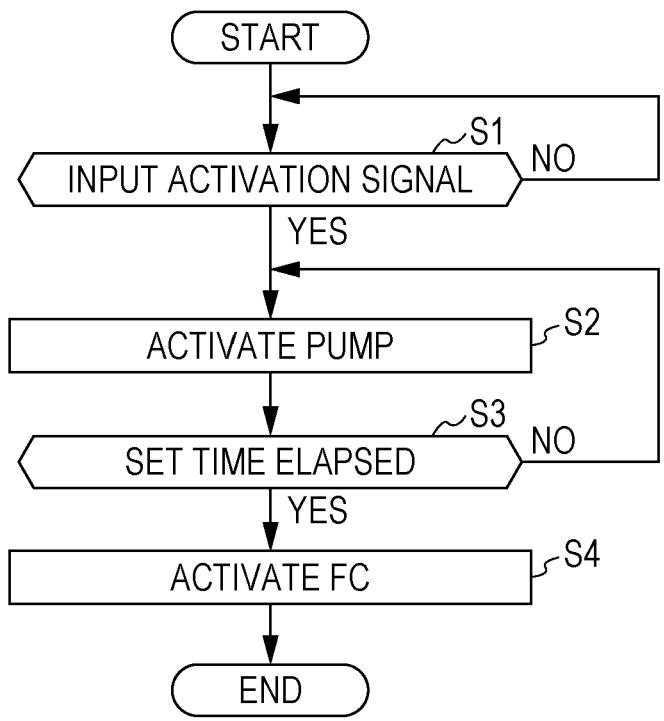
FIG. 2 is a flowchart illustrating the starting method.
Figure 3:
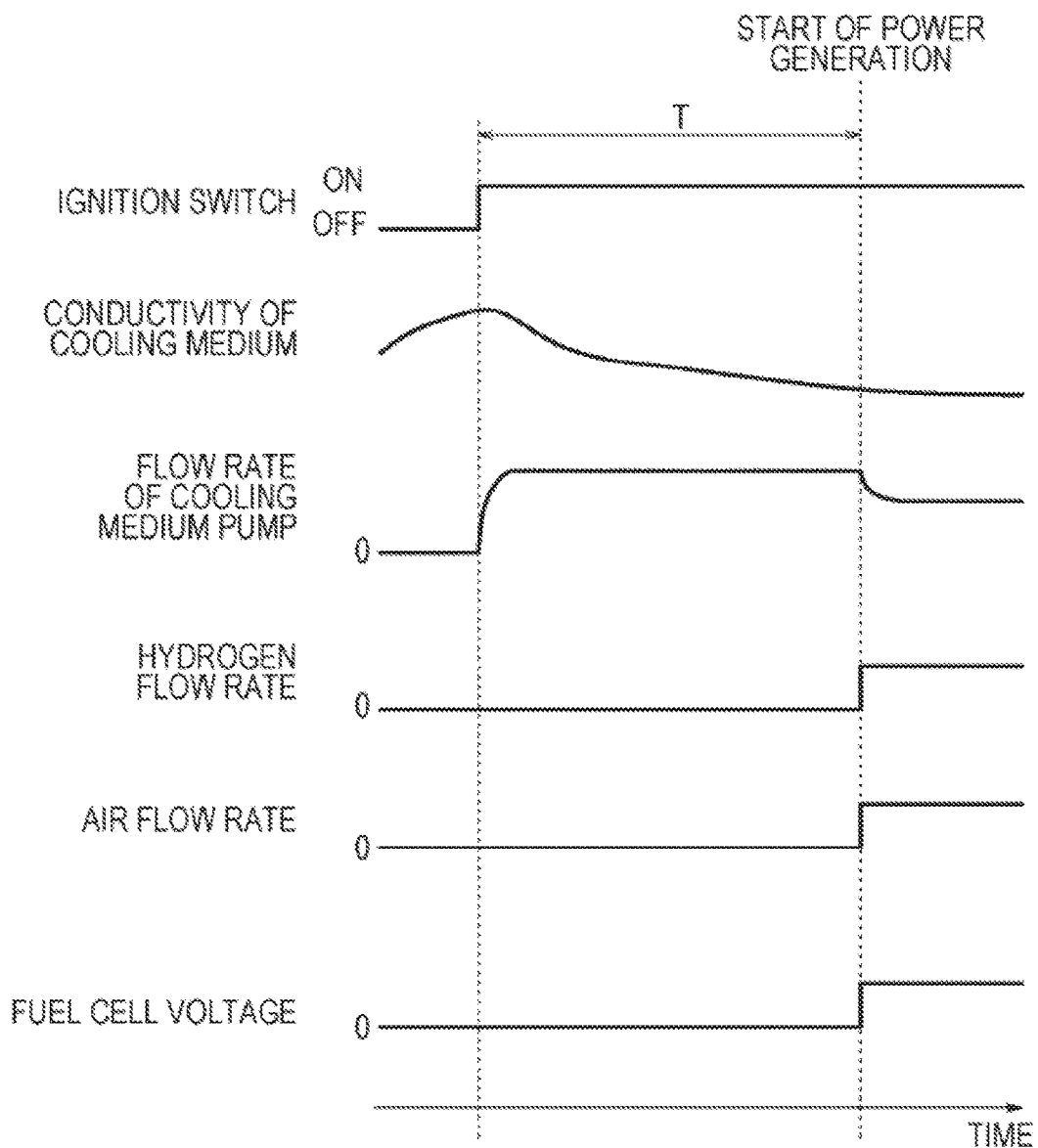
FIG. 3 is a timing chart illustrating the starting method.

The operation of the fuel cell 10 configured in this manner is described below based on the flowchart illustrated in FIG. 2, and the timing chart illustrated in FIG. 3 in relation to a starting method according to the first embodiment.

First, when the ignition switch (not shown) is turned on, the controller 22 determines that an activation signal for the fuel cell stack 12 has been inputted (YES in step S1). The process proceeds to step S2, and the cooling medium pump 60 that constitutes the cooling medium supply unit 18 is operated using the power from the battery 20.

Therefore, as illustrated in FIG. 1, a cooling medium is forced to circulate through the cooling medium circuit 56, and part of the cooling medium circulates along the bypass passage 62 and is supplied to the impurity removal mechanism 64. In the impurity removal mechanism 64, the conductive component in the cooling medium is removed, and the concentration (conductivity) of the conductive component containing the metal ions in the cooling medium reduces.

Figure 4:
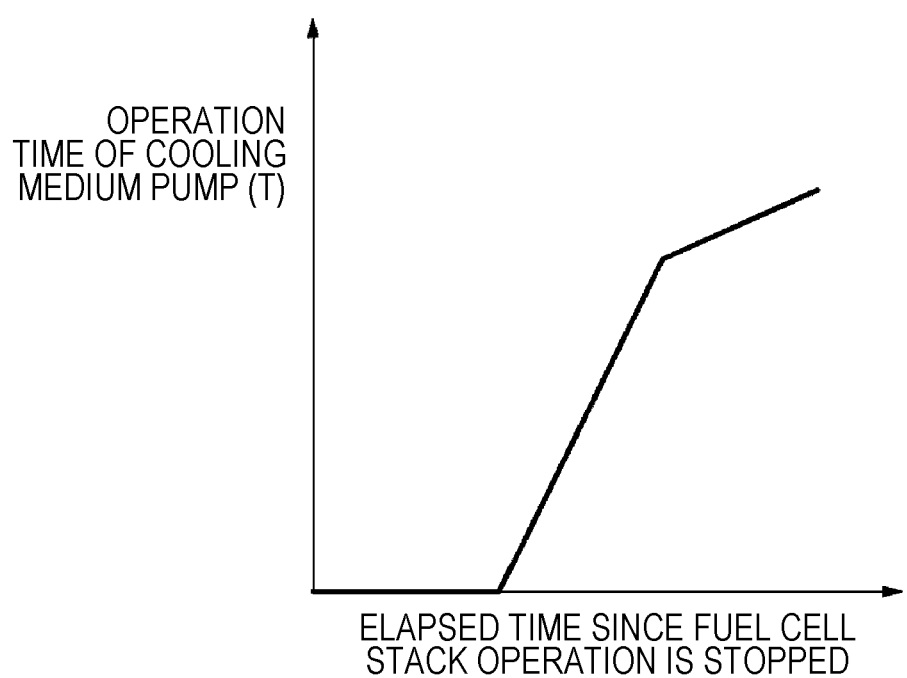
FIG. 4 is an illustrative graph for relationship between an elapsed time from a stop, and an operating time of a coolant pump.

In the controller 22, for example, as illustrated in FIG. 4, a conductive component removal time (setup time) T is defined with respect to an elapsed time from stopping of the fuel cell stack 12. The conductive component removal time T indicates an operation time of the cooling medium pump 60 taken for the conductivity of the cooling medium to reduce to a desired value (predetermined value), and the longer the stopping time is, the longer the conductive component removal time T is.

When it is determined that the conductive component removal time T has elapsed (YES in step S3), the process proceeds to step S4, and the fuel cell stack 12 is started. Specifically, the oxidant gas supply unit 14 is driven, and air which is an oxidant gas is supplied to the oxidant gas inlet communication hole 50a of the fuel cell stack 12. On the other hand, the fuel gas supply unit 16 is driven, and a hydrogen gas which is a fuel gas is supplied to the fuel gas inlet communication hole 52a of the fuel cell stack 12.

As illustrated in FIG. 1, air is supplied to the cathode electrode 34 through the oxidant gas passage 44 provided in each fuel cell 30 in the fuel cell stack 12. On the other hand, a hydrogen gas is supplied to the anode electrode 36 through the fuel gas passage 46 provided in each fuel cell 30 of the fuel cell stack 12.

Therefore, the air supplied to the cathode electrode 34 and the hydrogen gas supplied to the anode electrode 36 react electrochemically so that power is generated, and a fuel cell vehicle starts. The power obtained by the power generation is supplied to the load containing the drive motor 24, and thus the fuel cell vehicle can be driven.

By the operation of the cooling medium pump 60 in the cooling medium supply unit 18, a cooling medium is introduced from the cooling medium circuit 56 into the fuel cell stack 12 through the cooling medium inlet communication hole 54a. The cooling medium moves along the cooling medium passage 48 so as to cool the fuel cell 30, and is discharged from the cooling medium outlet communication hole 54b to the cooling medium circuit 56.

In this case, in the first embodiment, when the fuel cell stack 12 is started, the cooling medium pump 60 is operated before a fuel gas and an oxidant gas are supplied to start power generation. Therefore, a cooling medium is forced to be sent to the impurity removal mechanism 64, and the conductivity of the cooling medium is reduced by removing the conductive component in the cooling medium. As illustrated in FIG. 3, the conductivity of the cooling medium gradually reduces and becomes below a predetermined value.

Consequently, reduction of the insulation resistance of the cooling medium can be reliably suppressed by performing a simple process, and unpleasant driving noise can be prevented from occurring while a fuel cell vehicle is stopped. Moreover, the cooling medium pump 60 operates only when the fuel cell vehicle is started, thus an advantageous effect is obtained in that energy is not wastefully consumed but cost-effectively consumed. Accordingly, the fuel cell system 10 can be started under favorable conditions.

Figure 5:
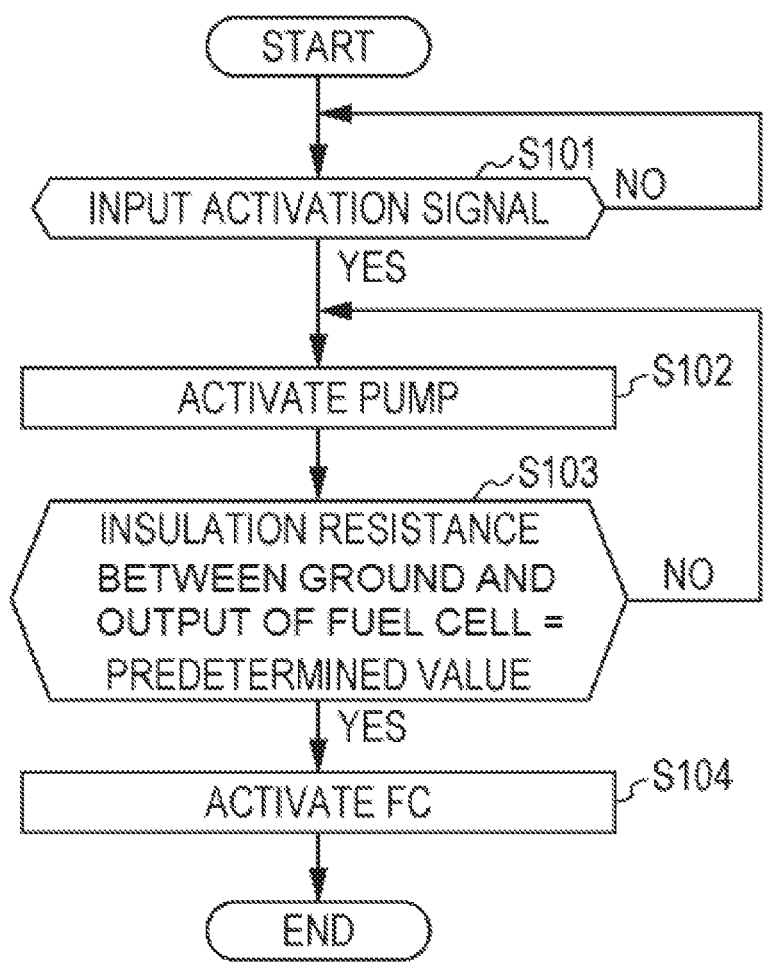
FIG. 5 is a flowchart illustrating a starting method according to a second embodiment of the present disclosure.
Figure 6:
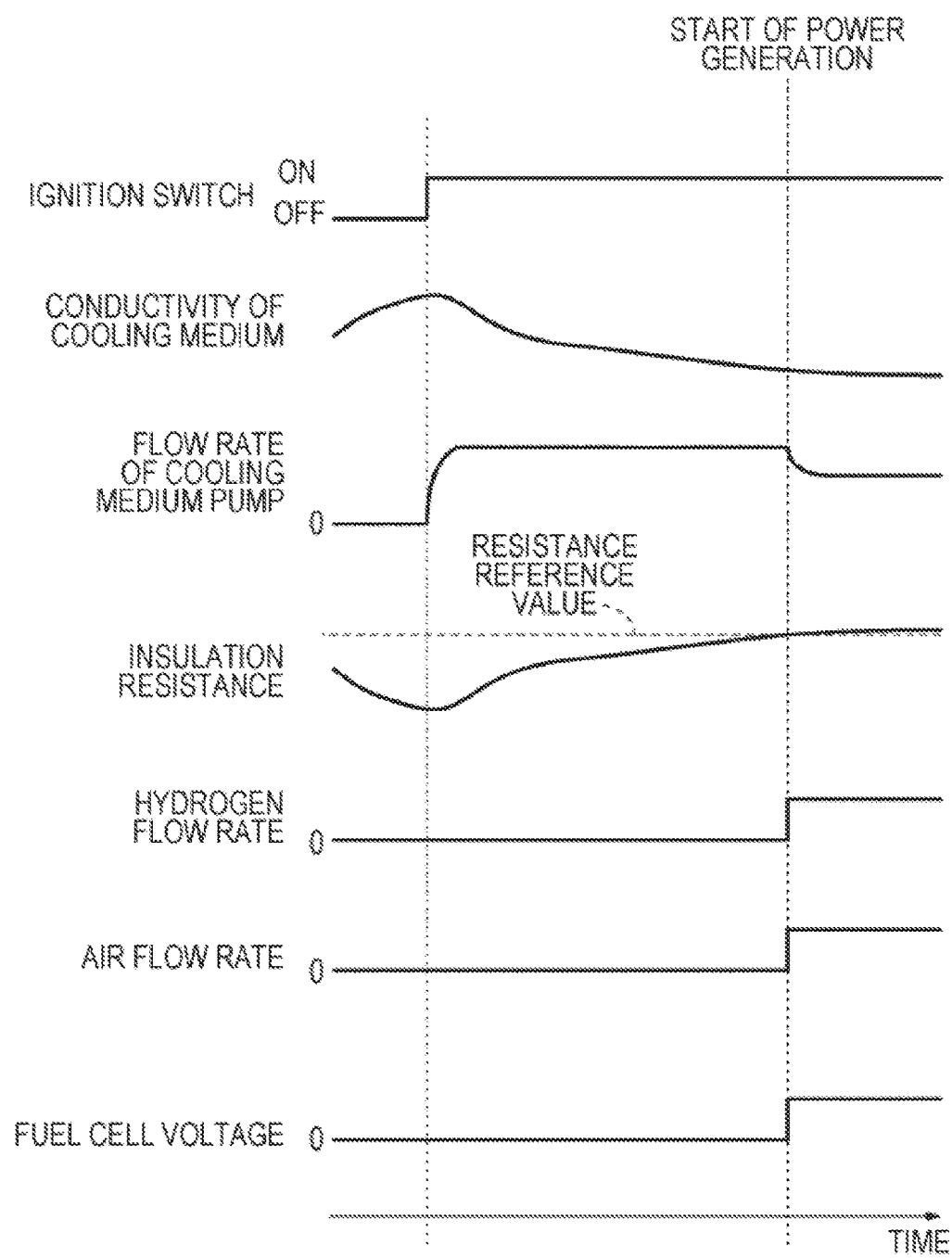
FIG. 6 is a timing chart illustrating the starting method.

Next, a starting method for the fuel cell system 10, according to a second embodiment of the present disclosure is described based on the flowchart illustrated in FIG. 5, and the timing chart illustrated in FIG. 6. Detailed description of the same process as in the first embodiment is not repeated. Similarly, in the second or later embodiment described below, description of the same process as in the first embodiment is not repeated.

When an activation signal of the fuel cell stack 12 is inputted (step S101), the controller 22 operates the cooling medium pump 60, and supplies a cooling medium to the impurity removal mechanism 64 (step S102). The controller 22 then determines whether or not the conductivity of the cooling medium has decreased to a desired value (predetermined value), based on an insulation resistance value obtaining from a ground connected detection sensor (not shown) which measures a resistance value between a fuel cell output and the ground (step S103).

When the controller 22 determines that the conductivity of the cooling medium has decreased to a desired value (a value with which an operating the fuel cell stack 12 is safe and causes no problem), i.e., determines that the insulation resistance value is increased to a predetermined value (YES in step S103), the process proceeds to step S104, and power generation (activation) of the fuel cell stack 12 is started.

Consequently, in the second embodiment, reduction of the insulation resistance of the cooling medium can be reliably suppressed by performing a simple process, and unpleasant driving noise can be prevented from occurring while a fuel cell vehicle is stopped, and thus the same effects as those of the above-described first embodiment are obtained.

Figure 7:
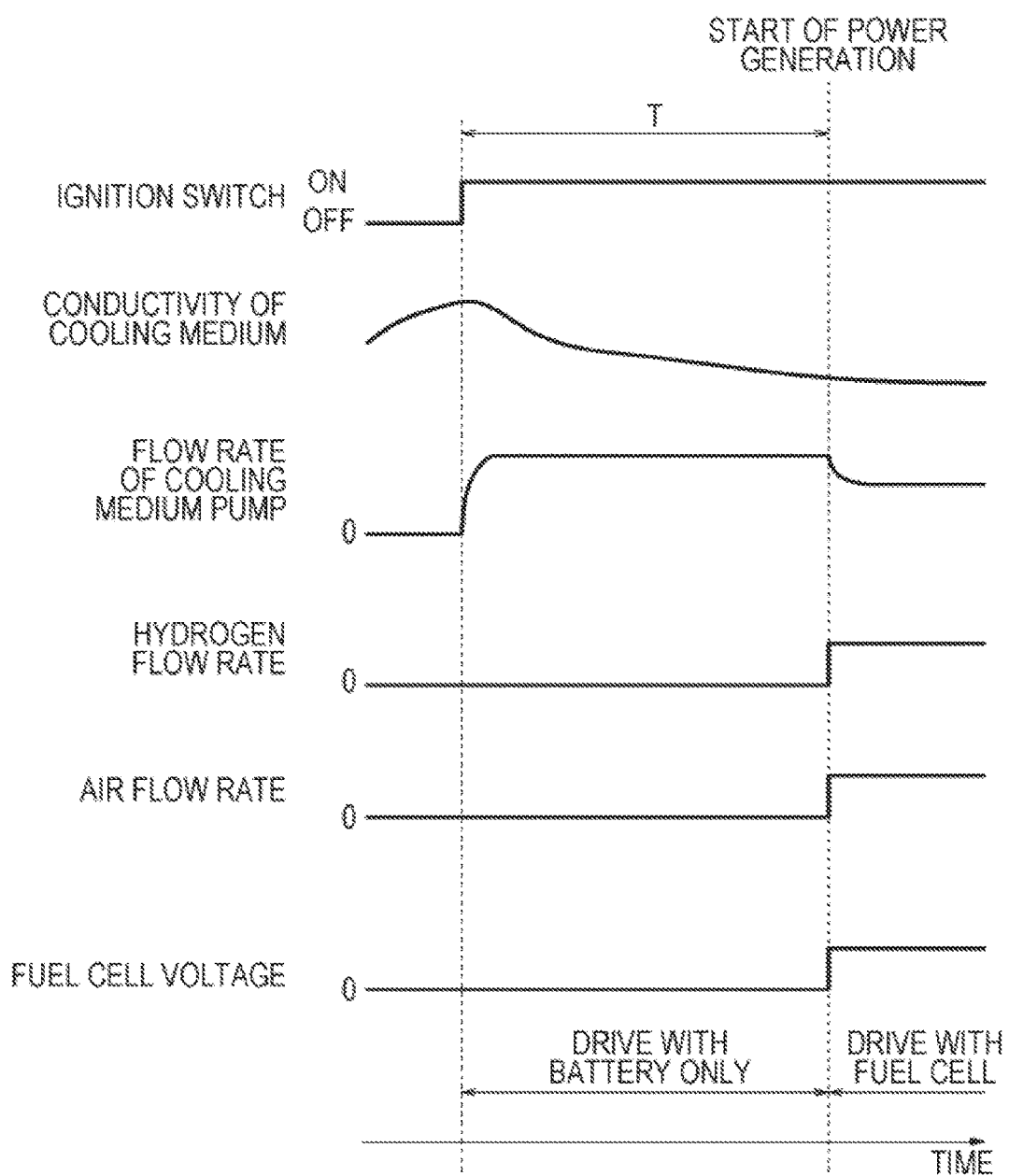
FIG. 7 is a timing chart illustrating a starting method according to a third embodiment of the present disclosure.

FIG. 7 is a timing chart illustrating a method of starting the fuel cell system 10, according to a third embodiment of the present disclosure.

In the third embodiment, since an activation signal of the fuel cell stack 12 is inputted, the fuel cell vehicle can keep moving using the power from the battery 20 until the fuel cell stack 12 is activated.

Therefore, even during the operation of the cooling medium pump 60 to remove the conductive component in the cooling medium, driving by the fuel cell is possible. Accordingly, an advantageous effect is obtained in that a waiting time since an ignition switch is turned on until the fuel cell vehicle can actually start to move may be reduced as much as possible.

Figure 8:
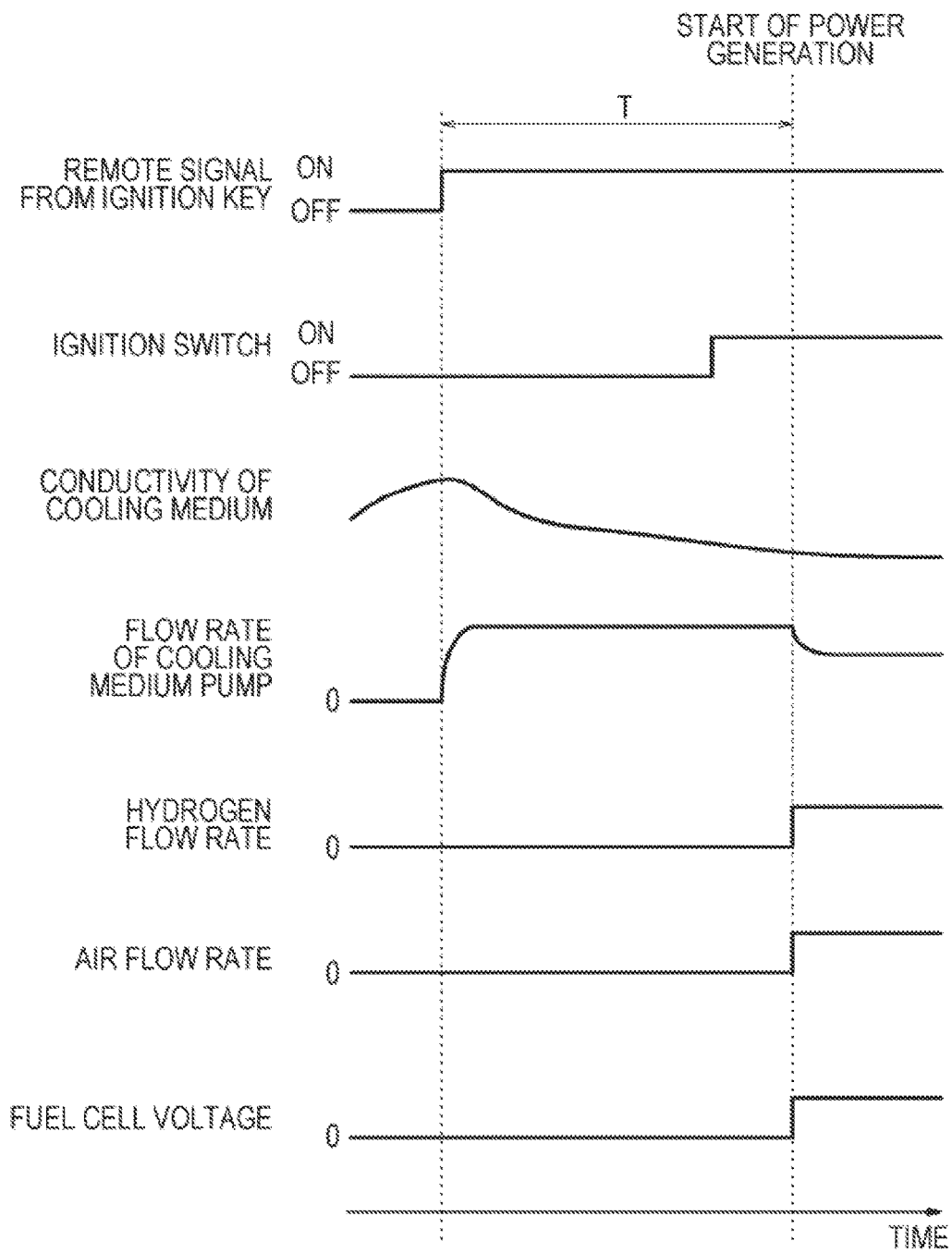
FIG. 8 is a timing chart illustrating a starting method according to a fourth embodiment of the present disclosure.

FIG. 8 is a timing chart illustrating a method of starting the fuel cell system 10, according to a fourth embodiment of the present disclosure.

In a fourth embodiment, when a radio signal is inputted to the controller 22 from an external wireless operation unit, for example, a keyless entry or a smart entry, the operation of the cooling medium pump 60 is started. Therefore, an advantageous effect is obtained in that the waiting time since an ignition switch is turned on until the fuel cell vehicle can actually start to move may be favorably reduced as much as possible.

Figure 9:
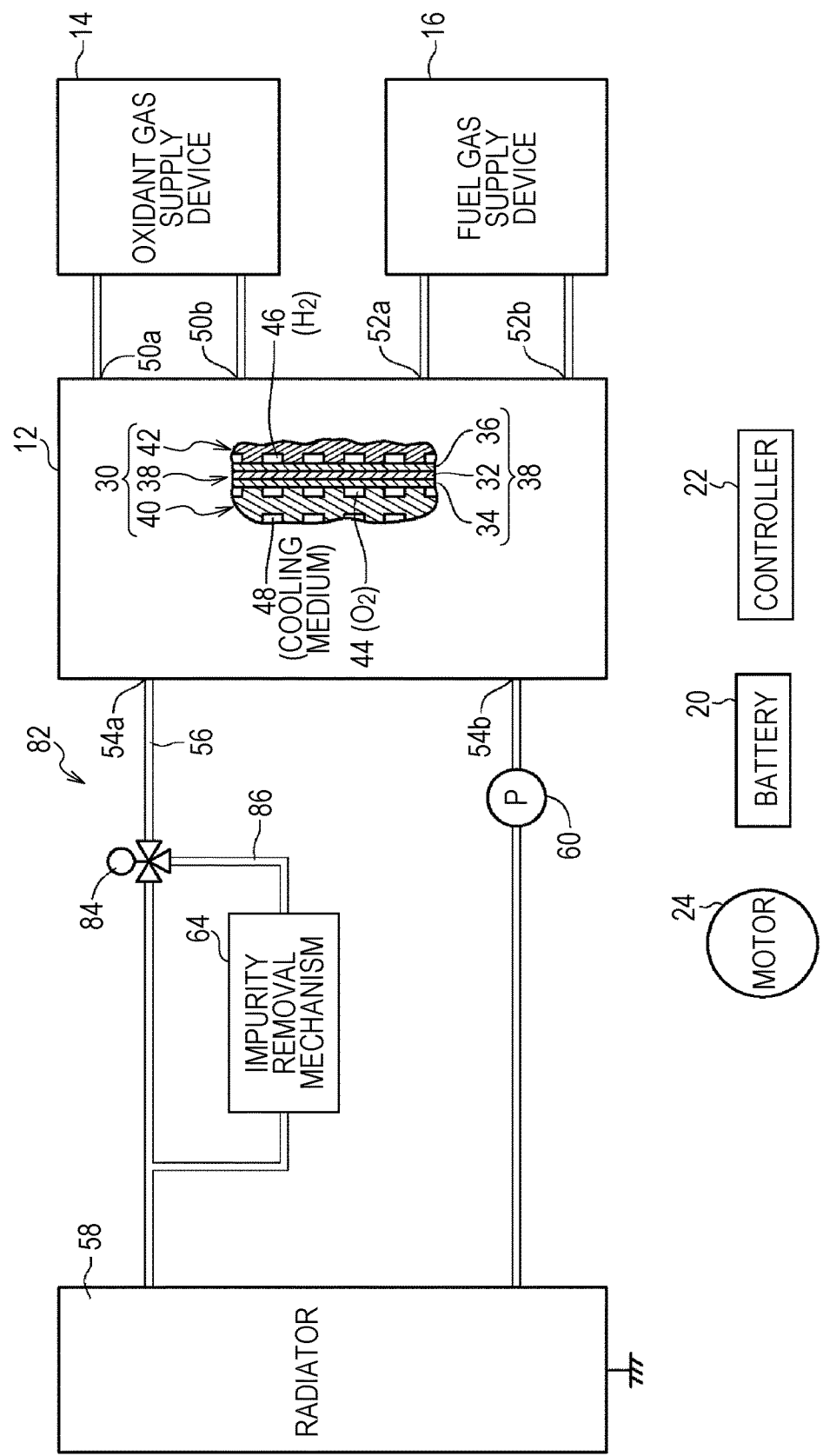
FIG. 9 is a schematic configuration diagram of another fuel cell system which adopts a starting method according to an embodiment of the present disclosure.

FIG. 9 is a schematic configuration diagram of another fuel cell system for a vehicle 80 which adopts a starting method according to an embodiment of the present disclosure. The same components as those of the fuel cell system 10 are labeled with the same reference symbols, and description is omitted.

The fuel cell system 80 includes a cooling medium supply unit 82, which is provided with a cooling medium circuit 56. The cooling medium circuit 56 is provided with, for example, a rotary electromagnetic three-way valve 84 which has a flow control function, and two outlets of the rotary electromagnetic three-way valve 84 are connected to the cooling-medium circuit 56 and branch path 86, respectively. The branch path 86 merges with the cooling medium circuit 56 upstream of the radiator 58, and the impurity removal mechanism 64 is disposed on the branch path 86.

In the fuel cell system 80 configured in this manner, the flow rate of a cooling medium to the branch path 86 is set to be low in normal driving conditions. Therefore, the pressure loss of the cooling medium, due to the impurity removal mechanism 64 can be suppressed, and the load of the cooling medium pump 60 can be reduced, thereby enabling improvement of efficiency.

On the other hand, the flow rate of the cooling medium to the branch path 86 is set to be high when the fuel cell is activated. Therefore, the conductivity of the cooling medium can be quickly reduced, and thus an advantageous effect is obtained in that starting of the fuel cell system 80 is effectively performed in a short time.

As discussed above, the present embodiment relates to a method of starting a fuel cell system for a vehicle, the fuel cell system for a vehicle including: a fuel cell having a membrane electrode assembly in which an anode-side electrode and a cathode-side electrode are disposed on both sides of the solid polymer electrolyte membrane, respectively; an oxidant gas supply unit which supplies an oxidant gas to a cathode side of the fuel cell; a fuel gas supply unit which supplies a fuel gas to an anode side of the fuel cell; and a cooling medium supply unit which circulates and supplies a cooling medium, which cools the fuel cell, to the fuel cell.

The starting method includes: determining whether or not an activation signal of the fuel cell has been inputted;

operating a pump for cooling medium circulation which constitutes the cooling medium supply unit when it is determined that the activation signal has been inputted, supplying the cooling medium to an impurity removal mechanism, thereby reducing a conductivity of the cooling medium; and driving the oxidant gas supply unit and the fuel gas supply unit so as to start activation of the fuel cell when it is determined that the conductivity of the cooling medium is less than or equal to a predetermined value. Thus, the conductivity of the cooling medium is reduced.

In the starting method, it is preferable that in reducing the conductivity of the cooling medium, it is determined whether or not the conductivity of the cooling medium has decreased to a predetermined value or less, based on an elapsed time from stopping of the fuel cell or an insulation resistance value of the cooling medium. Therefore, reduction of the insulation resistance of the cooling medium can be reliably suppressed by performing a simple process, and unpleasant driving noise can be prevented from occurring while a fuel cell vehicle is stopped. Moreover, the pump for cooling medium circulation operates only when the fuel cell vehicle is started, thus energy is not wastefully consumed but cost-effectively consumed. Accordingly, the fuel cell system can be started under favorable conditions.

Obviously, numerous modifications and variations of the present invention are possible in light of the above teachings. It is therefore to be understood that within the scope of the appended claims, the invention may be practiced otherwise than as specifically described herein.

What is claimed is:

1. A method of starting a fuel cell system for a vehicle, the method comprising:
    determining whether or not an activation signal of a fuel cell provided in the fuel cell system has been inputted, the fuel cell including a membrane electrode assembly in which an anode-side electrode and a cathode-side electrode are respectively disposed on both sides of a solid polymer electrolyte membrane;
    operating, if it is determined that the activation signal has been inputted, a cooling medium circulation pump which constitutes a cooling medium supply device to supply a cooling medium to an impurity removal mechanism for reducing a conductivity of the cooling medium;
    determining whether or not the conductivity of the cooling medium is less than or equal to a predetermined value, based on one of an elapsed time from stopping of the fuel cell and an insulation resistance value of the cooling medium;
    driving an oxidant gas supply device and a fuel gas supply device in the fuel cell system to start activation of the fuel cell if it is determined that the conductivity of the cooling medium is less than or equal to the predetermined value, the oxidant gas supply device being provided to supply an oxidant gas to a cathode side of the fuel cell, the fuel gas supply device being provided to supply a fuel gas to an anode side of the fuel cell; and
    moving, from a time when the activation signal of the fuel cell is inputted until a time when the fuel cell is activated, the vehicle using a power from a battery, without driving the oxidant gas supply device and the fuel gas supply device and with operating the cooling medium circulation pump.

2. The method of starting a fuel cell system for a vehicle according to claim 1,
    wherein the driving of the oxidant gas supply device and the fuel gas supply device includes driving the oxidant gas supply device and the fuel gas supply device if a conductive component removal time has elapsed from the operating of the cooling medium circulation pump, the conductive component removal time being defined based on an elapsed time from stopping of the fuel cell.

3. The method of starting a fuel cell system for a vehicle according to claim 1,
    wherein the driving of the oxidant gas supply device and the fuel gas supply device includes driving the oxidant gas supply device and the fuel gas supply device if it is determined that an insulation resistance value between a ground and an output from the fuel cell is increased to a predetermined value.

4. A method of starting a fuel cell system for a vehicle, the method comprising:
    determining whether or not an activation signal of a fuel cell provided in the fuel cell system has been inputted, the activation signal being received from a remote wireless operation unit, the fuel cell including a membrane electrode assembly in which an anode-side electrode and a cathode-side electrode are respectively disposed on both sides of a solid polymer electrolyte membrane;
    operating, if it is determined that the activation signal has been inputted, a cooling medium circulation pump which constitutes a cooling medium supply device to supply a cooling medium to an impurity removal mechanism for reducing a conductivity of the cooling medium, the impurity removal mechanism being provided along a cooling medium conduit that extends between the membrane electrode assembly and an upstream side of a radiator such that the impurity removal mechanism is upstream of the radiator;
    determining whether or not the conductivity of the cooling medium is less than or equal to a predetermined value, based on one of an elapsed time from stopping of the fuel cell and an insulation resistance value of the cooling medium; and
    driving an oxidant gas supply device and a fuel gas supply device in the fuel cell system to start activation of the fuel cell if it is determined that the conductivity of the cooling medium is less than or equal to the predetermined value and if it is determined that the activation signal has been inputted, the oxidant gas supply device being provided to supply an oxidant gas to a cathode side of the fuel cell, the fuel gas supply device being provided to supply a fuel gas to an anode side of the fuel cell, wherein the method further comprises:
    providing the impurity removal mechanism on a branch path having an inlet and an outlet that are both provided along the cooling medium conduit that extends between the membrane electrode assembly and the upstream side of the radiator;
    providing the inlet of the branch path with a valve that controls a flow rate of cooling medium along the branch path to the impurity removal mechanism; and
    controlling the valve such that the flow rate of the cooling medium to the branch path is set to be at a first flow rate in normal driving conditions, and the flow rate of the cooling medium to the branch path is set to be at a second flow rate when the fuel cell is activated, the second flow rate being higher than the first flow rate.

5. The method of starting a fuel cell system for a vehicle according to claim 4,
    wherein the driving of the oxidant gas supply device and the fuel gas supply device includes driving the oxidant gas supply device and the fuel gas supply device if a conductive component removal time has elapsed from the operating of the cooling medium circulation pump, the conductive component removal time being defined based on an elapsed time from stopping of the fuel cell.

6. The method of starting a fuel cell system for a vehicle according to claim 4,
wherein the driving of the oxidant gas supply device and the fuel gas supply device includes driving the oxidant gas supply device and the fuel gas supply device if it is determined that an insulation resistance value between a ground and an output from the fuel cell is increased to a predetermined value.

7. The method of starting a fuel cell system for a vehicle according to claim 1, further comprising:
providing the impurity removal mechanism along a cooling medium conduit that extends between the membrane electrode assembly and an upstream side of a radiator such that the impurity removal mechanism is upstream of the radiator.

8. The method of starting a fuel cell system for a vehicle according to claim 7, further comprising:
providing the impurity removal mechanism is provided on a branch path having an inlet and an outlet that are both provided along the cooling medium conduit that extends between the membrane electrode assembly and the upstream side of the radiator.

9. The method of starting a fuel cell system for a vehicle according to claim 8, further comprising:
providing the inlet of the branch path with a valve that controls a flow rate of cooling medium along the branch path to the impurity removal mechanism.

10. The method of starting a fuel cell system for a vehicle according to claim 9, further comprising:
controlling the valve such that the flow rate of the cooling medium to the branch path is set to be at a first flow rate in normal driving conditions, and the flow rate of the cooling medium to the branch path is set to be at a second flow rate when the fuel cell is activated, the second flow rate being higher than the first flow rate.

* * * * *